United States Patent [19]

Fiech

[11] Patent Number: 5,390,713
[45] Date of Patent: Feb. 21, 1995

[54] UNITIZED FUEL STORAGE TANK

[76] Inventor: Manfred M. Fiech, c/o Euro Tank, P.O. Box 478, Silver Springs, Fla. 33489-0478

[21] Appl. No.: 988,836

[22] Filed: Dec. 10, 1992

[51] Int. Cl.[6] .............................................. B67D 5/60
[52] U.S. Cl. ........................................ 141/98; 141/86; 141/95; 141/59; 141/104; 137/234.6; 137/587; 73/49.2
[58] Field of Search ................ 141/44, 45, 59, 83, 141/86, 88, 95, 98, 94, 100, 104, 105, 285, 290; 137/234.6, 312, 314, 363, 364, 375, 587, 588; 73/49.2 T, 49.2 R, 49.3, 40; 220/565

[56] References Cited

U.S. PATENT DOCUMENTS

| | | |
|---|---|---|
| 1,622,030 | 3/1927 | Edwards . |
| 1,979,451 | 11/1934 | Clapp . |
| 2,004,074 | 6/1935 | Kiley . |
| 2,260,356 | 10/1941 | White . |
| 2,959,826 | 11/1960 | Larsen et al. ................ 137/234.6 X |
| 3,532,114 | 10/1970 | Frees ................................. 137/588 |
| 3,815,327 | 6/1974 | Viland .................................. 55/80 |
| 3,915,206 | 10/1975 | Fowler et al. ...................... 141/59 |
| 4,090,525 | 5/1978 | Potter ............................... 137/171 |
| 4,100,758 | 7/1978 | Mayer ................................. 62/54 |
| 4,166,485 | 9/1979 | Wokas ............................ 141/59 X |
| 4,592,386 | 6/1986 | Mooney ............................ 137/588 |
| 4,615,362 | 10/1986 | Hartman et al. ................... 141/86 |
| 4,685,327 | 8/1987 | Sharp ............................ 73/49.2 T |
| 4,807,675 | 2/1989 | Sharp ............................... 141/86 |
| 4,884,709 | 12/1989 | McCarthy ........................ 220/565 |
| 4,951,844 | 8/1990 | Sharp ............................... 220/469 |
| 4,989,447 | 2/1991 | Gelin ............................ 73/49.2 T |
| 5,018,558 | 5/1991 | Sharp ............................ 141/59 X |
| 5,038,838 | 8/1991 | Bergamini et al. ................ 141/59 |
| 5,167,142 | 12/1992 | Sharp ............................ 73/49.2 T |
| 5,217,052 | 6/1993 | Sharp ............................... 141/86 |

FOREIGN PATENT DOCUMENTS

| | | | |
|---|---|---|---|
| 0681502 | 9/1939 | Germany ......................... 137/364 |
| 1118037 | 11/1961 | Germany ..................... 137/234.6 |

Primary Examiner—J. Casimer Jacyna
Attorney, Agent, or Firm—Cushman, Darby & Cushman

[57] ABSTRACT

A unitized tank structure is provided having a vessel, at least one fill line coupled to the vessel providing access to fill the vessel, at least one sump riser portion coupled to the vessel and extending therefrom, and at least one vacuum extraction system disposed within said sump riser portion. The extraction system includes fluid return structure to permit vapor or liquid which enters the sump riser portion to be returned to the vessel. The tank structure also includes at least one vent line disposed within the sump riser and extending therefrom so as to be in contact with the atmosphere and at least one dispensing line disposed within the sump riser portion and penetrating the vessel.

20 Claims, 8 Drawing Sheets

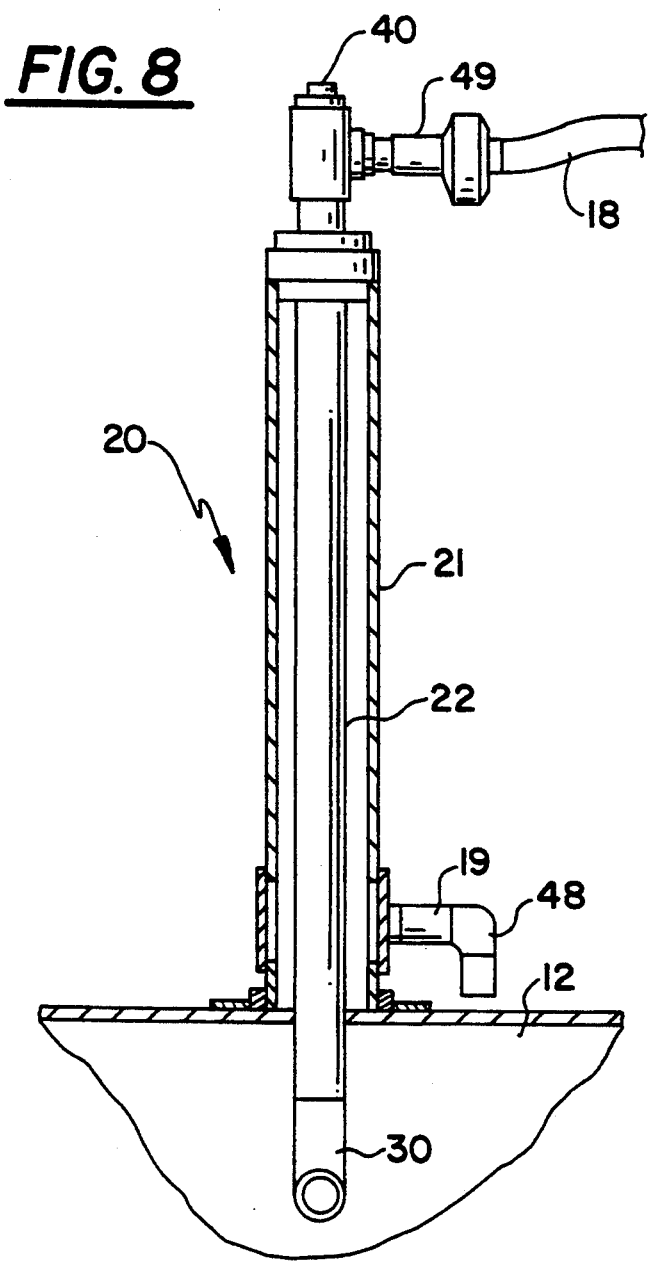

UNITIZED FUEL STORAGE TANK

BACKGROUND OF THE INVENTION

1. Field Of The Invention

The present invention relates to an underground fuel storage tank structure uniquely designed with a built in sump portion and permanently affixed product piping lines disposed for easy connection to a dispenser. The structure is outfitted with automatic and continuous vacuum extraction of vapor and product that may accumulate within the sump portion. Access is provided to the sump portion.

2. Related Art

Presently, there are thousands of fuel service stations located across the country. Each year many new service stations are constructed requiring underground storage tanks. In addition, existing service stations are renovated by replacing old fuel storage tanks with new tanks.

Generally, the installation of a fuel storage tank requires the removal of earth creating a deep hole large enough to place the fuel storage tank therein. Underground piping is then connected to the fuel storage tank. The underground piping is provided for filling and venting the fuel storage tank. Other piping is also attached to the fuel storage tank for distribution of its contents to a dispenser.

The fuel storage tank and associated piping are covered with compacted earth or backfill. A traffic pad made of asphalt or concrete is constructed to support automobiles to be fueled. Finally, a concrete center isle is poured and the dispensers are attached to the underground piping to complete the construction. Upon completion, the piping protrudes through the center isle.

In conventional tank installations, there is typically little or no access to the product piping once construction is complete. Studies have shown that approximately ninety percent of all product leaks and discharges occur through the product piping, even at new installations. Consequently, leak detection devices and double walled product piping are installed during construction to ensure safety. If a leak should occur in the piping, repair can only be accomplished by jackhammering into the traffic pad and center isle to locate the leak and repair or replace the defective piping. This method of repair can be costly, time consuming and disrupts fuel dispensing service. Underground sumps have been used to contain some of the piping. However, the sump is considered to be an explosive hazard if it is non-vented. Furthermore, should a conventional tank need replacement due to a leak or contamination, the cost of replacement becomes substantial since the replacement involves the excavation of the entire old or contaminated tank and the repiping of the venting of the distribution system.

SUMMARY OF THE INVENTION

It is an object of the present invention to provide a unitized underground fuel storage tank structure that combines the strength and durability of a vessel of preferably double-walled construction with an easy to install configuration including a sump portion, a vapor vent, dispensing product piping, and a continuous sump-vapor vacuum extraction system. These features give continuous added safety and protection.

In accordance with the present invention, a tank structure is provided which includes a vessel, at least one fill line coupled to the vessel providing access to fill the vessel, at least one sump riser portion coupled to the vessel and extending therefrom, and at least one vacuum extraction system disposed within said sump riser portion. The extraction system includes fluid return structure to permit vapor or liquid which enters the sump riser portion to be returned to the vessel. The tank structure also includes at least one vent line disposed within the sump riser portion and extending therefrom so as to be in contact with the atmosphere and at least one dispensing line disposed within the sump riser portion and penetrating the vessel.

The entire structure is connected in a unitized way so that installation directly beneath a center isle of a gas station can be easily completed. This unitized configuration saves construction costs and installation time.

Within the sump riser portion is a sump-vapor vacuum extraction system. The fluid return structure of the extraction system preferably includes an intake vent valve having a pipe stem with an opening spaced about one quarter inch above the vessel's top surface. There is an outlet from the extraction system that opens directly into the vessel. As fuel is pumped from the vessel, the rising negative pressure therein creates sufficient vacuum to pull vapors and or liquid that might accumulate in the sump riser portion, back into the vessel. No in-line leak detector is required in the sump riser portion due to the vacuum extraction system's continuous removal of dangerous vapors and/or liquids.

A vent stack is also preferably provided as a part of the extraction system which extends vertically upward from the vessel to the atmosphere to allow positive pressure to vent.

The negative vapor pressure can also be used to incorporate a second stage vapor recovery which can be easily installed on the top of the extraction system for additional fume recovery.

The present invention provides a unitized underground storage tank structure that requires no tie down because of its overburden (backfill material) hold down design. The overburden hold down design prevents the underground vessel from floating when empty and fully submerged. Two hold down beams, one located at either end of the vessel aid in keeping the unitized tank structure submerged and also provide anchoring for an optional overhead canopy.

The present invention can be installed without additional piping because product lines and vent lines are affixed directly to the tank. After installation of the vessel, vent and dispensing lines are located within the sump riser portion directly under the fuel dispenser and vent stack connections. A manway is preferably located next to the fuel dispenser to allow a person to gain easy access to all the piping and or pump equipment within the sump riser portion in a submerged pump (pressure) installation.

The present invention ensures that the environment within the sump riser portion is intrinsically safe by removing flammable and potentially explosive vapors therefrom. The vapor/liquid extraction system first removes vapors and liquids via negative pressure created when product is dispensed from the tank. In addition, there is a continuous vortex created by the vent pipe which is connected to a vent stack which preferably extends at least twelve feet above the ground or at least higher than any adjacent structure.

The present invention vessel size preferably ranges from 1,000 to 20,000 plus gallons. The vessel can also be designed to handle more than a single product. Vessels holding more than a single product can be designed to deliver multiple products through multiple sumps located underneath multiple fuel dispensers.

The installation process of the present invention is relatively simple. Since the piping is unitized with the tank structure, no additional piping is required. The vessel is buried in a position directly below the designated location of a pump island. Backfill is used to cover the vessel. No soap testing or other leak testing is required on pressure pipes of the vessel. Compaction of the backfill and a concrete pour of the pump island can be accomplished within twenty-four to forty-eight hours after beginning the installation. Fuel dispensers are installed directly above the sump riser portions. Product lines and vent stacks are connected via short lengths of flex or rigid piping.

Other objects, features and characteristics of the present invention, as well as the methods of operation and functions of the related elements of the structure, the combination of parts and the economics of manufacture, will become more apparent upon consideration of the following detailed description and appended claims with reference to the accompanying drawings. In the drawings like structure is referenced by like reference numerals, all of which form a part of this specification.

BRIEF DESCRIPTION OF THE DRAWINGS

FIG. 8 is an enlarged view of the extraction system provided in accordance with the principles of the present invention.

DETAILED DESCRIPTION OF THE INVENTION

A unitized tank structure, generally indicated at 10 and provided in accordance with the present invention, is shown in FIGS. 1–8. It is understood and appreciated that, although the invention is illustrated as an underground tank structure for the storage of gasoline, the invention can be used for a wide variety of liquids and can be installed in a variety of locations.

Figure 1:
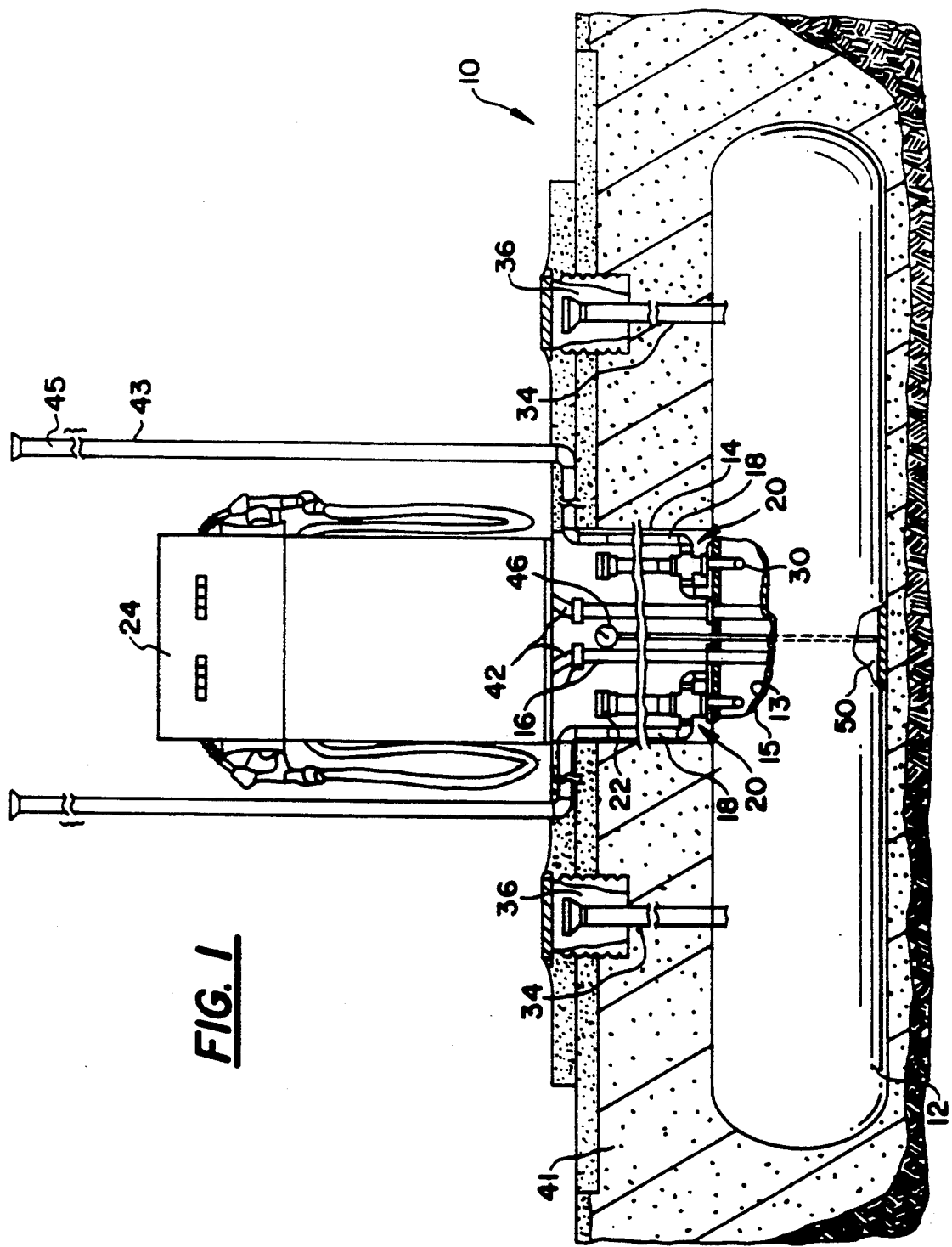
FIG. 1 is an elevational view of the present invention installed in the ground with a commercial suction fuel dispenser for two products attached thereto.
Figure 2:
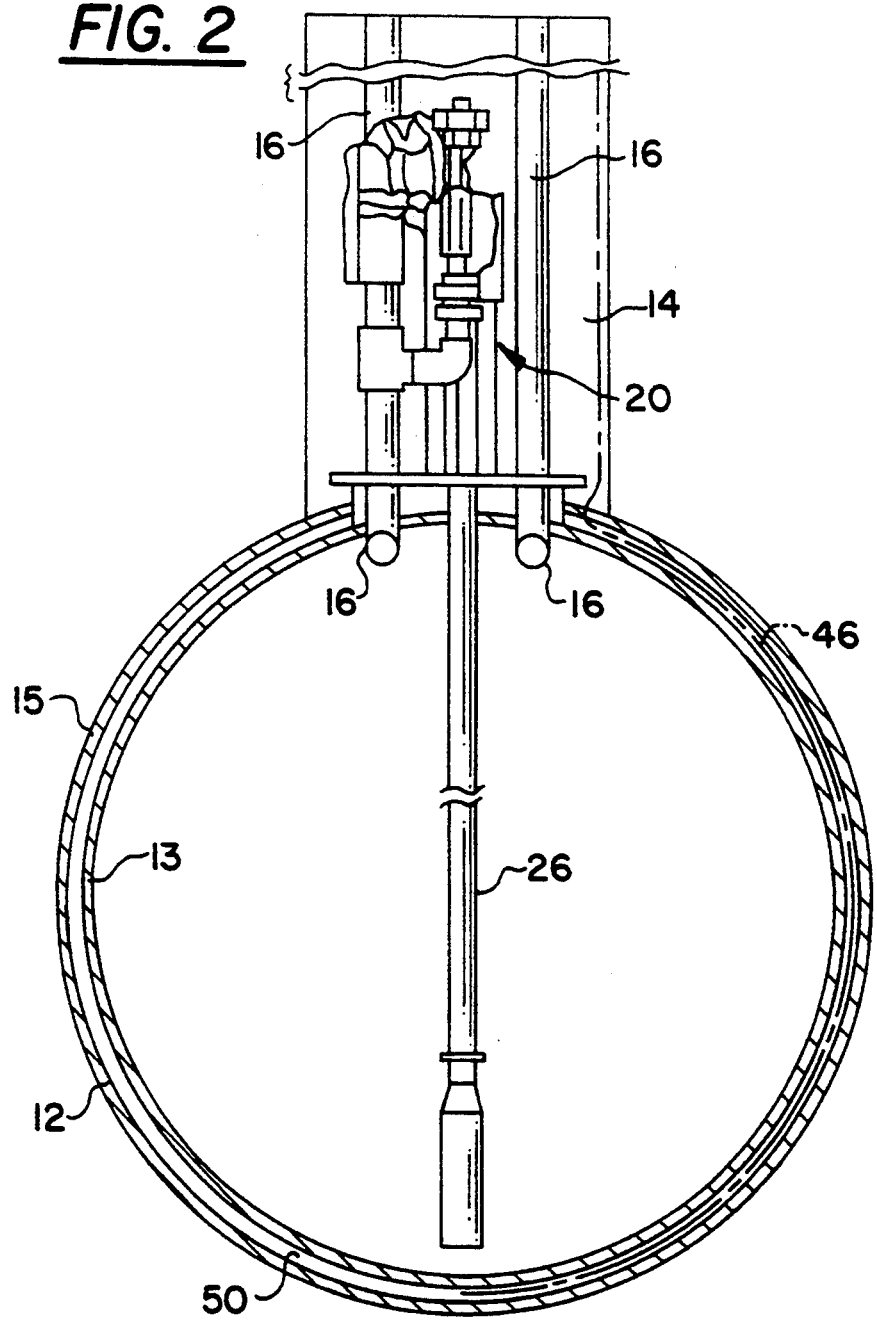
FIG. 2 is an elevational side view of the present invention with an extraction pump located within the sump riser portion.

The unitized tank structure 10 includes a vessel 12 that preferably has a conventional double-walled construction, having inner wall 13 and outer wall 15, as is shown in FIGS. 1 and 2. A sump riser portion 14 is coupled to the top of the vessel 12 such that the bottom edge of the riser portion 14 embraces the vessel 12. Dispensing lines 16 and 17 for dispenser 24, are disposed within the riser portion 14. Dispensing lines 16 and 17 penetrate the vessel 12 and extend downward into the vessel so extraction of fluid within the vessel, either by suitable pumps or suction apparatus, can be accomplished. Also disposed within the riser portion 14 are vapor vent lines 18, a sump/vacuum extraction system, generally indicated at 20, and optional secondary stage vacuum lines 22.

Figure 3:
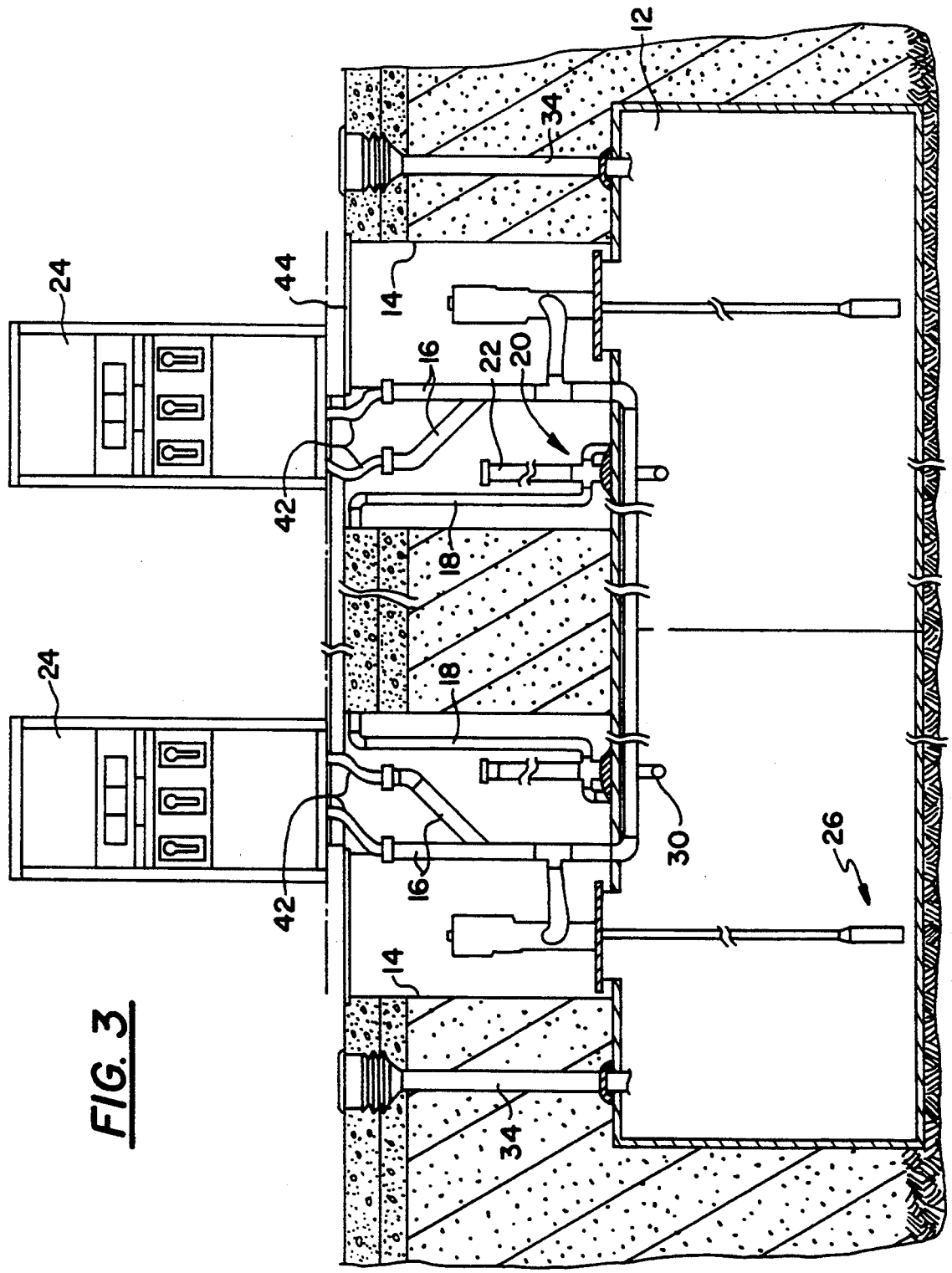
FIG. 3 is an elevational view of the present invention having multiple dispensers and a multi-compartment vessel shown installed in the ground.
Figure 4:
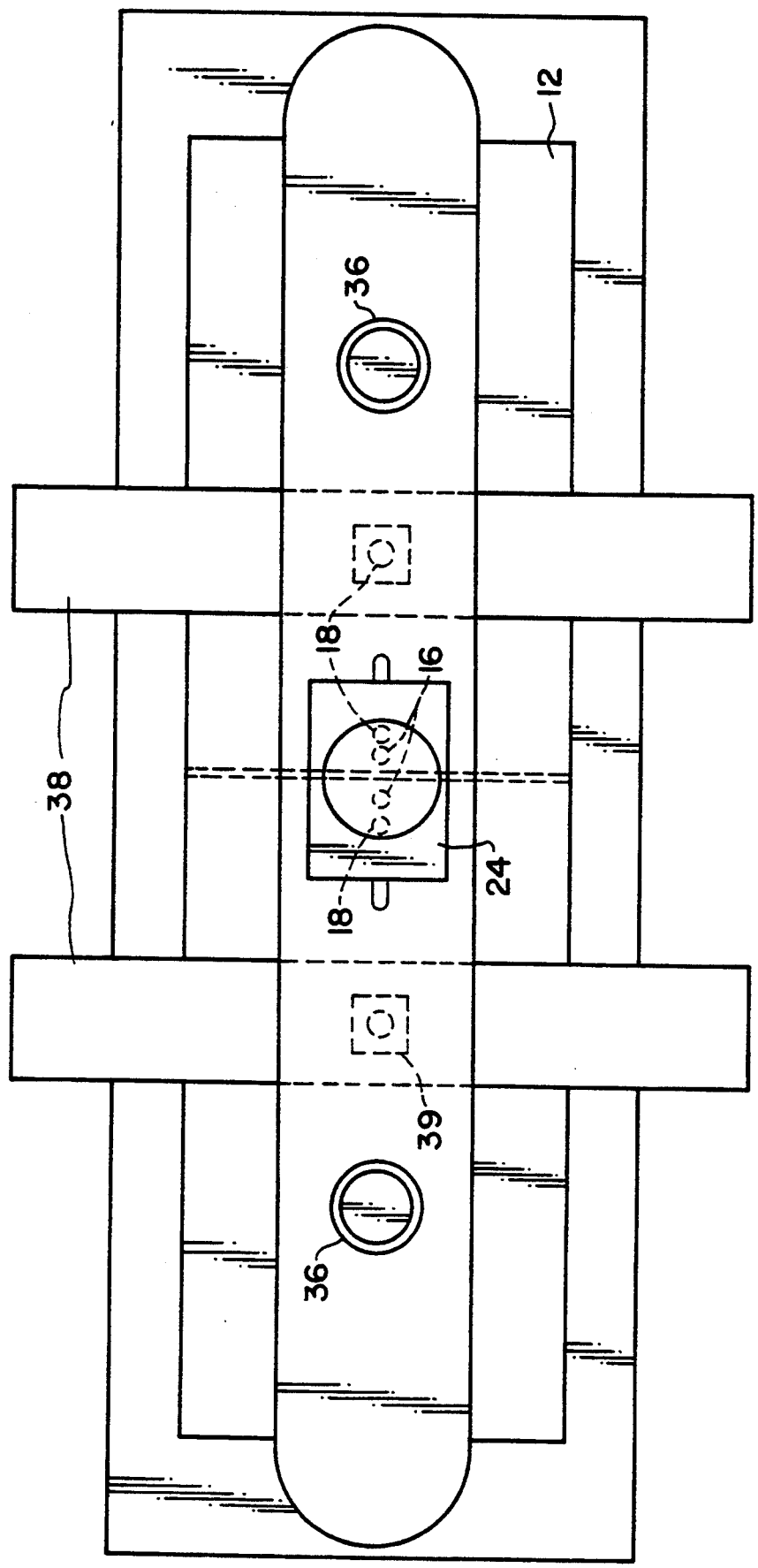
FIG. 4 is a top view of the present invention showing a multiple compartment vessel with a single sump riser portion.
Figure 5:
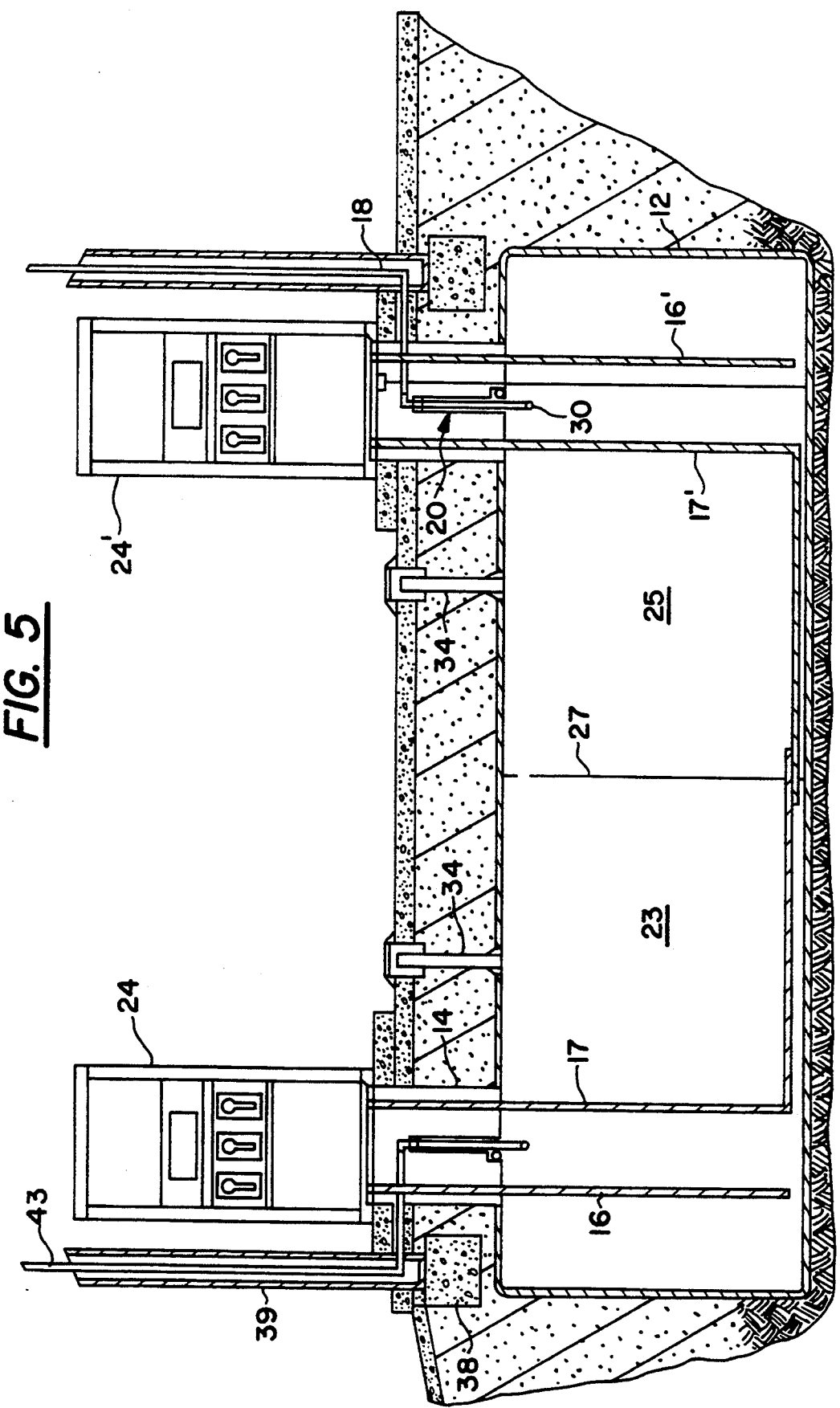
FIG. 5 is an elevational view of a the present invention installed in the ground shown with multiple fuel dispensers and suction product piping attached thereto.
Figure 6:
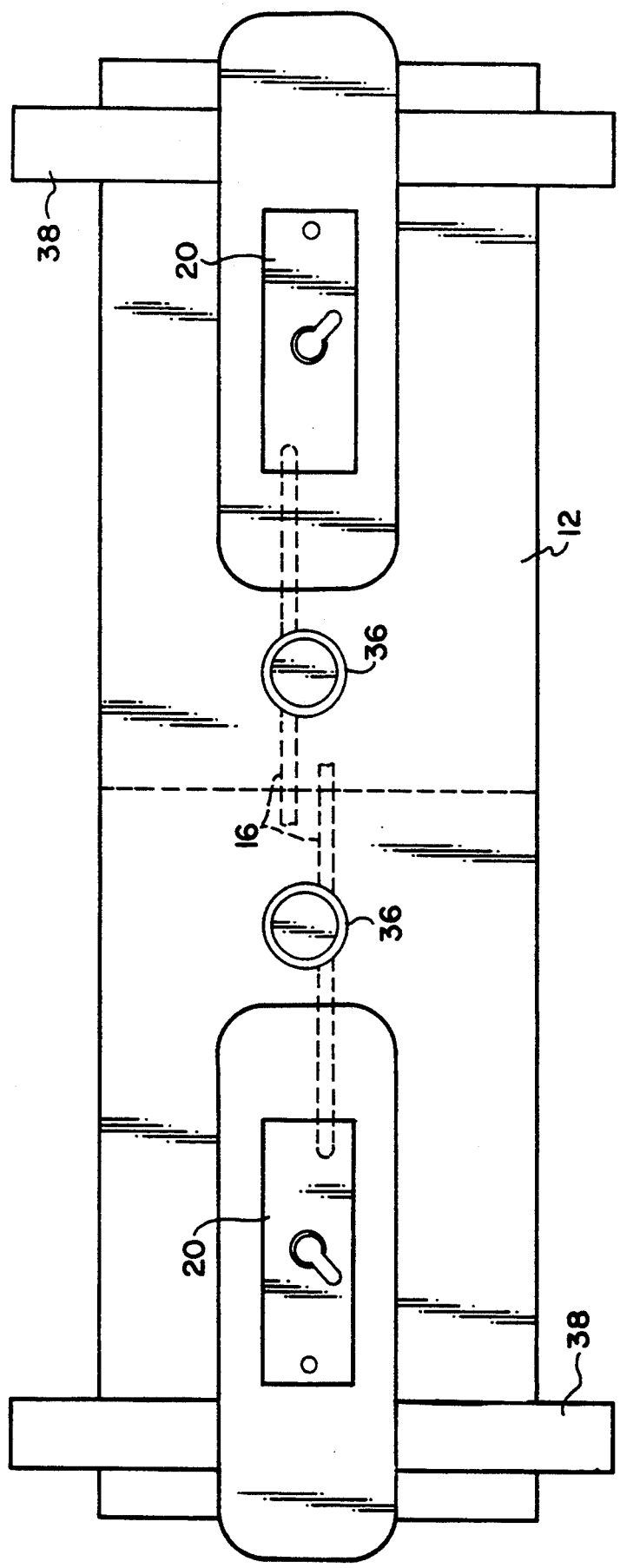
FIG. 6 is a top view of the present invention showing the sump riser portion and spill containment portions of a multiple dispenser installation.
Figure 7:
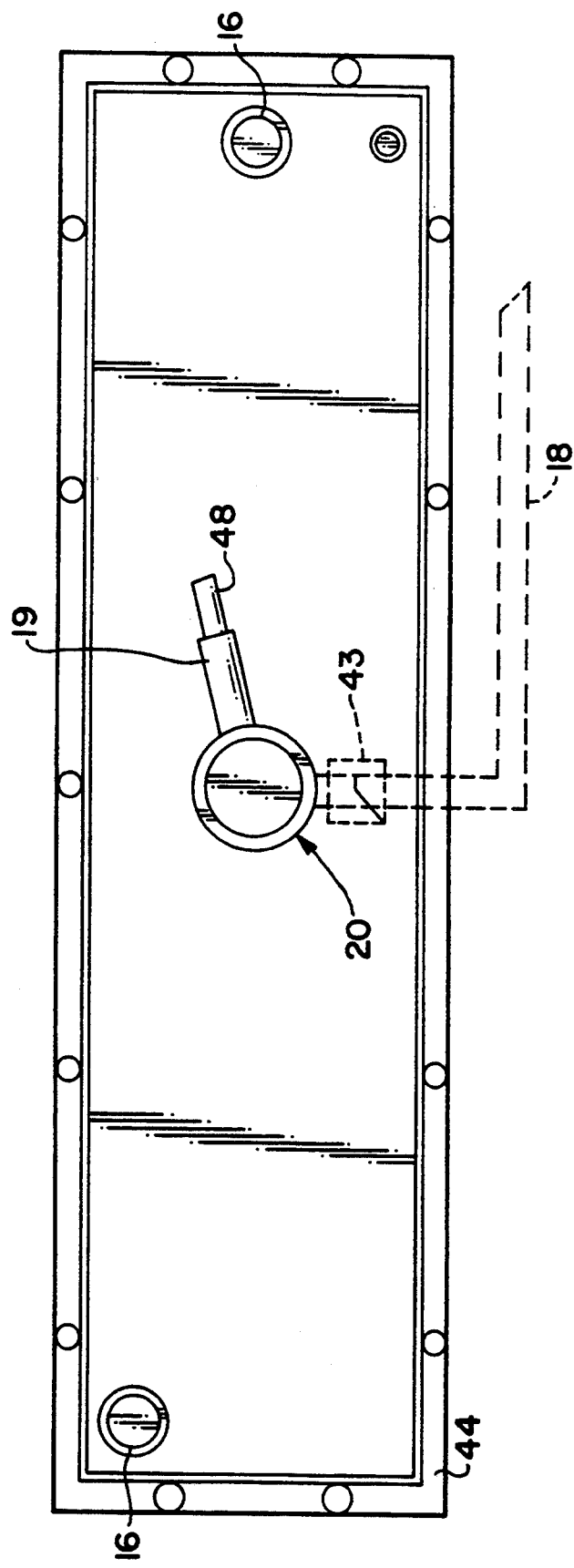
FIG. 7 is a top view of the sump riser portion provided in accordance with the present invention.

The dispensing lines 16 and 17 extend from the top of the riser portion 14 to near the bottom of the vessel, penetrating the vessel 12 at the top thereof, within the riser portion 14. In large vessel configurations, an optional pump 26 may be installed which extends to the bottom of the vessel and is coupled to the dispensing lines 16 at an opposite end thereof (FIG. 3). Should the vessel 12 have multiple sections as shown in FIGS. 3 and 5 at 23 and 25, dispensing lines 16 and 17 are provided for dispensing fluids from within those separate compartments of the vessel 12. Generally, fluids are removed by a vacuum pump disposed within a dispenser 24. As shown in FIG. 5, when multiple fuel dispensers 24 and 24' are provided, each dispenser 24 includes a blending valve. Thus, two products can be mixed to provide three product availability. For example, if gasoline is being dispensed, 87 and 93 Octane gasoline can be blended to provide 89 Octane gasoline. The 87 Octane gas being in vessel portion 23 and the 93 Octane gas being in vessel portion 25. Thus, as shown in FIG. 5, the vessel portion 23 is isolated from vessel portion 25 via a partition wall, designated by numeral 27. For blending to occur at dispenser 24, dispensing line 17 enters the first vessel portion 23, but, as shown, extends through partition wall 27 and into vessel portion 25 to bring the 93 Octane gas, held in vessel portion 25, to dispenser 24. Dispensing line 16 also enters vessel portion 23, as shown, and provides direct access to the 87 Octane, held in vessel portion 23, thus providing a way to bring 87 Octane to dispenser 24. As shown, the other dispenser 24' has a similar cross-over piping arrangement shown at 16' and 17'.

Vapor vent lines 18, also located within the riser portion 14, vent positive vapor pressure that may build up within the vessel 12 out to the atmosphere. Each vapor vent line 18 is coupled to the a sump/vacuum extraction system 20 via check valve 49 and riser pipe 21 (FIG. 8). The sump/vacuum extraction system 20 is coupled to the vessel 12. The extraction system 20 is disposed within the riser portion 14 and includes a overfill vent valve 30 coupled to vent line 22, which extends into the vessel to stop fluid from exiting the vessel via the extraction system 20. Also included in the extraction system 20 is a pipe stem 48 having an opening spaced about one quarter inch above the vessel's top surface. A check valve 19 is coupled to the pipe stem. The check valve 19 is affixed to a riser pipe 21. As fuel is pumped from the vessel 12, the rising negative pressure within the vessel creates sufficient vacuum to pull vapors and/or liquid that may have accumulated in the riser portion 14 back into the vessel 12. An optional secondary stage vapor recovery may be included in the extraction system 20 for the return of fumes as fuel is being dispensed from the dispenser 24 into an automobile or other fuel tank, by adding a reducer or connector to pipe end 40.

Fill lines 34 are attached to the vessel 12 and used to fill the vessel or vessel compartments, as shown in FIG. 1. The fill lines 34 have overfill containment members 36 for containing fuel that may splash while filling vessel 12.

The unitized tank structure 10 preferably includes a canape hold down beam 38 and column 39 (FIGS. 4 and 5) for overburden tank (buoyancy) flotation and anchorage and to support an optional overhead canopy (not shown).

The unitized tank structure 10 is preferably placed in the ground as a single unit with sufficient backfill 41 or other conventional covering techniques being used to cover the tank structure. The riser portion 14 is located directly under the designated location for the fuel dispenser 24. This arrangement permits easy and proper connection of the dispenser 24 and access to the dispensing lines 16 housed within the riser portion 14.

It should be understood that multiple riser portions 14 can be included in the unitized tank structure 10 so that multiple fuel dispensers 24 can be mounted thereabove, as shown in FIGS. 3 and 5. A riser portion 14 can also be incorporated around the fill lines.

The unitized tank structure 10 of the present invention requires only the simplest of additional piping, such as flex hoses 42 used to connect dispensing lines 16 to dispensers 24, and vapor vent lines 18 to vent stack assembly 43, to complete the installation. As shown in FIG. 1, the vent stack assembly includes a vacuum vent valve 45. A check valve can also be used in place of the vent valve 45.

In pressure system having submersible pumps, a man hole cover 44 (FIG. 3) is installed next to each dispenser 24 above the riser portion 14 for easy access to all piping within the riser portion 14. Additionally, a vacuum monitoring gauge 46 is preferably provided within the riser portion 14 and extends into the annular interstitial space 50 between the double walls of the vessel. The gauge monitors leaks in compliance with government regulations which may occur in the double walled vessel, as shown in FIGS. 1 and 2. Various sensors may be used in place of monitoring gauge 46. For example, liquid sensors, hydrocarbon sensors, and hydrostatic sensors (used in fiberglass vessels only) may be employed.

While the invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A unitized tank structure comprising:
   a vessel having a plurality of isolated compartments;
   fill lines coupled to the vessel providing access to fill the vessel;
   at least one sump riser portion coupled to the vessel and extending therefrom;
   a plurality of dispensing lines disposed within the sump riser portion and penetrating the vessel so as to communicate with at least a first compartment of said plurality of compartments, at least one dispensing line of said plurality of dispensing lines extending into and through said at least the first compartment and into open communication with another one of said plurality of compartments;
   at least one vacuum extraction system disposed within said sump riser portion, the extraction system including fluid return structure to permit one of vapor and liquid which accumulates in the sump riser portion to be returned to the vessel by negative pressure created within said vessel; and
   at least one vent line disposed within the sump riser portion and extending therefrom so as to be in contact with the atmosphere to vent positive pressure from said vessel.

2. The unitized tank structure of claim 1, wherein the vessel is of double-walled construction.

3. The unitized tank structure of claim 1, in combination with a dispensing member, the dispensing member being coupled to the dispensing lines, the sump riser portion being disposed under the dispensing member.

4. The unitized tank structure of claim 3, wherein said dispensing member includes a pumping member attached to at least one dispensing line.

5. The unitized tank structure of claim 1, wherein the vessel and the sump riser portion are disposed underground.

6. The unitized tank structure of claim 1, wherein one fill line is provided for each compartment.

7. The unitized tank structure of claim 1, wherein the fluid return structure includes a pipe element having an opening disposed near an exterior surface of the vessel and a check valve coupled between the pipe element and the vessel, the pipe element and check valve being disposed within the sump riser portion, whereby said negative pressure within the vessel creates a vacuum which pulls said one of vapor and liquid through the opening of the pipe element and through the check valve back into the vessel.

8. The unitized tank structure of claim 1, further comprising a spill containment element coupled to the fill lines to contain spilled fill fluid.

9. The unitized tank structure of claim 1, wherein the vessel has more than one outer wall.

10. The unitized tank structure of claim 1, wherein at least one dispensing line extends toward the bottom of the vessel.

11. The unitized tank structure of claim 1, wherein said vessel is of double-walled construction having an inner wall and an outer wall defining a space therebetween, a monitoring element having a sensor portion being disposed within the space and a gauge portion thereof being disposed within the sump riser portion.

12. The unitized tank structure of claim 1, wherein said compartments are separated by at least one partition, said one dispensing line entering and extending through at least the first compartment through a partition so as to enter and be in open communication with another one of said plurality of compartments.

13. The unitized tank structure of claim 1, wherein said extraction system is constructed and arranged to be capable of returning vapors to said vessel as fluid is dispensed from said dispensing member.

14. An apparatus for storing and dispensing fluids comprising:
   a vessel having a plurality of isolated compartments;
   fill lines coupled to the vessel providing access to fill the vessel;
   at least one sump riser portion coupled to the vessel and extending vertically upward therefrom;
   at least one vacuum extraction system disposed within said sump riser portion, the extraction system including fluid return structure to permit one of vapor and liquid which accumulates in the sump riser portion to be returned to the vessel by negative pressure created within said vessel;

at least one vent line disposed within the sump riser portion and extending therefrom so as to be in contact with the atmosphere to vent positive pressure from said vessel;

a plurality of dispensing lines disposed within the sump riser portion and penetrating the vessel so as to communicate with at least a first compartment of said plurality of compartments, at least one dispensing line of said plurality of dispensing lines extending into and through said at least the first compartment and into open communication with another one of said plurality of compartments; and at least one dispensing member coupled to the dispensing lines for removing fluid from the vessel.

15. The apparatus of claim 14, wherein the sump riser portion is disposed under the dispensing member.

16. The apparatus of claim 14, wherein the vessel and the sump riser portion are disposed underground.

17. The apparatus of claim 14, wherein one fill line is provided for each compartment.

18. The unitized tank structure of claim 14, wherein the fluid return structure includes a pipe element having an opening disposed near an exterior surface of the vessel and a check valve coupled between the pipe element and the vessel, the pipe element and check valve being disposed within the sump riser portion, whereby said negative pressure within the vessel creates a vacuum which pulls said one of vapor and liquid through the opening in the pipe element and through the check valve back into the vessel.

19. The apparatus of claim 14, further comprising spill containment elements coupled to the fill lines to contain spilled fill fluid.

20. The apparatus of claim 14, wherein said dispensing member includes a pumping member coupled to at least one dispensing line.

* * * * *